US010702842B2

(12) United States Patent
Kanellopoulos et al.

(10) Patent No.: US 10,702,842 B2
(45) Date of Patent: *Jul. 7, 2020

(54) METHOD FOR RETURNING POLYMER TO A FLUIDISED BED REACTOR

(71) Applicant: Borealis AG, Vienna (AT)

(72) Inventors: Vasileios Kanellopoulos, Linz (AT); Klaus Nyfors, Porvoo (FI); Gunter Weickert, Ahaus (DE); Eric-Jan Prinsen, Aadorp (NL)

(73) Assignee: BOREALIS AG, Vienna (AT)

( * ) Notice: Subject to any disclaimer, the term of this patent is extended or adjusted under 35 U.S.C. 154(b) by 139 days.

This patent is subject to a terminal disclaimer.

(21) Appl. No.: 15/776,848

(22) PCT Filed: Dec. 21, 2016

(86) PCT No.: PCT/EP2016/082169
§ 371 (c)(1),
(2) Date: May 17, 2018

(87) PCT Pub. No.: WO2017/108945
PCT Pub. Date: Jun. 29, 2017

(65) Prior Publication Data
US 2018/0369775 A1  Dec. 27, 2018

(30) Foreign Application Priority Data
Dec. 22, 2015  (EP) .................................. 15201811

(51) Int. Cl.
B01J 8/24  (2006.01)
B01J 8/18  (2006.01)
(Continued)

(52) U.S. Cl.
CPC .......... B01J 8/1863 (2013.01); B01J 8/0055 (2013.01); B01J 8/1818 (2013.01); B01J 8/24 (2013.01);
(Continued)

(58) Field of Classification Search
None
See application file for complete search history.

(56) References Cited

U.S. PATENT DOCUMENTS 9,382,359 B2 * 7/2016 Kanellopoulos ....... B01J 8/1827
2014/0202847 A1 * 7/2014 Bergstra ................... B29B 9/16
203/96

FOREIGN PATENT DOCUMENTS

EP  2495038 A1  9/2012
EP  2745925 A1  6/2014
(Continued)

OTHER PUBLICATIONS

International Search Report dated Apr. 3, 2017 from PCT/EP2016/082169.

Primary Examiner — Richard A Huhn
(74) Attorney, Agent, or Firm — Fay Sharpe LLP

(57) ABSTRACT

The present invention deals with a process of polymerising at least one olefin in a fluidised bed in a fluidised bed polymerisation reactor comprising a top zone, a middle zone in direct contact and below, a bottom zone in direct contact with and below the middle zone and wherein the reactor does not comprise a fluidisation grid. The process comprises passing a stream comprising the fluidisation gas and polymer particles into a separation step and withdrawing a stream comprising the polymer particles from the separation step and returning it to the polymerisation reactor. The
(Continued)

process comprises adding a support gas stream to the stream comprising the polymer particles downstream of the separation step.

20 Claims, 1 Drawing Sheet

(51) Int. Cl.
*C08F 110/02* (2006.01)
*C08J 11/04* (2006.01)
*C08F 6/00* (2006.01)
*C08J 11/02* (2006.01)
*C08F 2/34* (2006.01)
*B01J 8/00* (2006.01)
*C08F 2/01* (2006.01)

(52) U.S. Cl.
CPC ............... *C08F 2/34* (2013.01); *C08F 6/005* (2013.01); *C08F 110/02* (2013.01); *C08J 11/02* (2013.01); *C08J 11/04* (2013.01); *B01J 2208/00761* (2013.01); *B01J 2208/00991* (2013.01); *C08F 2/01* (2013.01)

(56) References Cited

FOREIGN PATENT DOCUMENTS

| WO | WO 2014/032794 A1 | 3/2014 | |
| WO | WO-2014032794 A1 * | 3/2014 | .......... B01J 19/2465 |

* cited by examiner

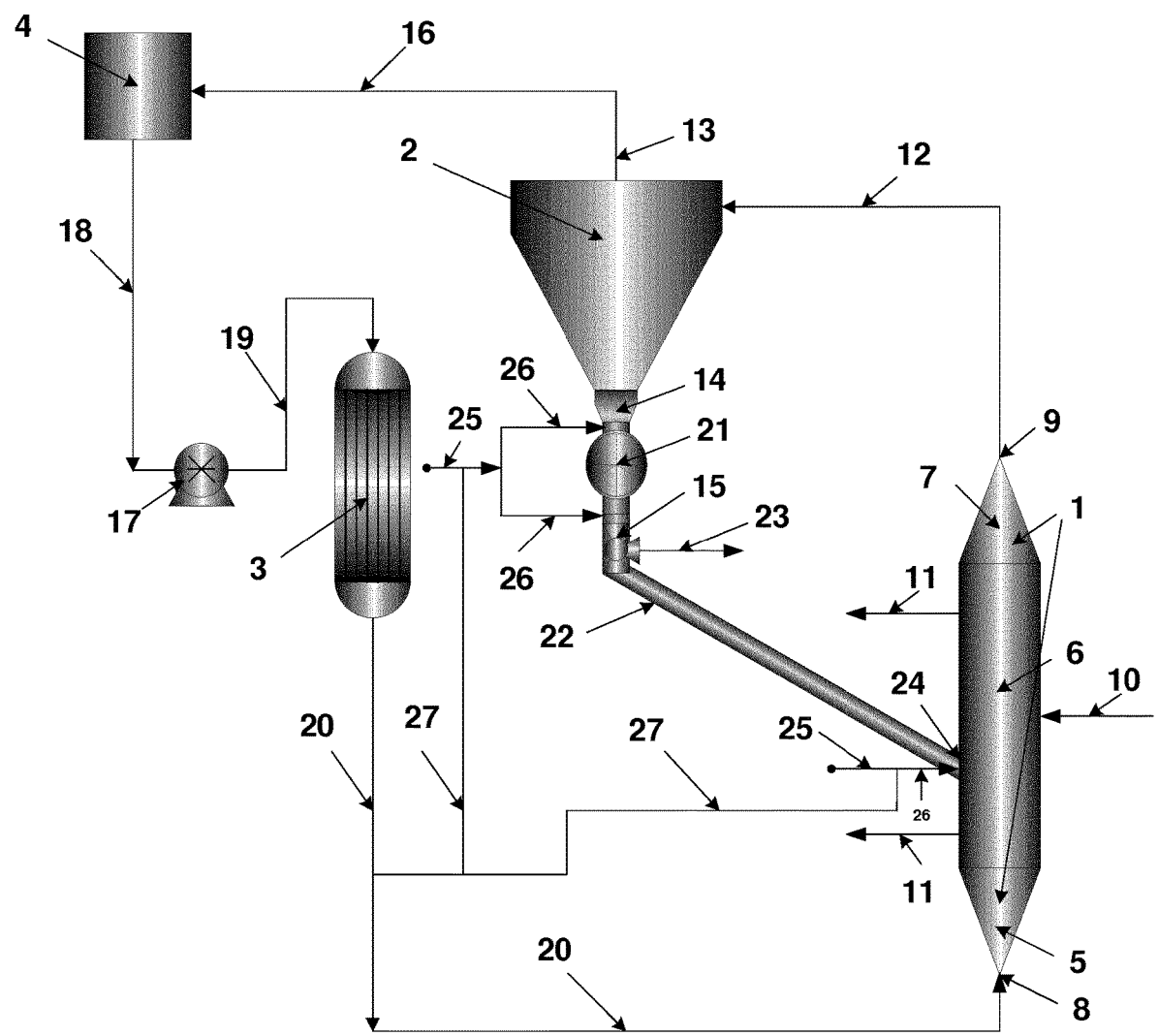

METHOD FOR RETURNING POLYMER TO A FLUIDISED BED REACTOR

This is a 371 of PCT Patent Application Serial No. PCT/EP2016/082169 filed Dec. 21, 2016, which claims priority to European Patent Application Serial No. 15201811.5 filed Dec. 22, 2015, the entire contents of which are incorporated herein by reference.

FIELD OF THE INVENTION

The present invention is directed to the polymerisation of olefins in a fluidised bed reactor. More specifically, the present invention is directed to the polymerisation of olefins in a vertical fluidised bed reactor having no fluidisation grid.

PRIOR ART AND PROBLEM TO BE SOLVED

EP-A-2495037 and EP-A-2495038 disclose a process where olefins are polymerised in a fluidised bed reactor where the reactor does not contain a gas distribution plate. The superficial gas velocity within the bed in the cylindrical part was reported to be from 0.1 to 0.3 m/s.

WO-A-2014032794 discloses a process where polymer is separated from the fluidisation gas stream by using a cyclone. The document does not address the problems in the powder transfer in the connection pipe between the cyclone and the polymerisation reactor.

In spite of the processes disclosed in the prior art there still remains a need for a process for olefin polymerisation which can be operated in a stable manner so that the powder is returned to the fluidised bed smoothly and without interruptions.

SUMMARY OF THE INVENTION

The present invention provides a process of polymerising at least one olefin in a fluidised bed in a fluidised bed polymerisation reactor comprising a top zone having a generally conical shape, a middle zone in direct contact and below said top zone having a generally cylindrical shape, a bottom zone in direct contact with and below the middle zone and having a generally conical shape and wherein a base of a fluidised bed is formed and wherein the reactor does not comprise a fluidisation grid, the process comprising the steps of (i) passing a first stream of fluidisation gas into the bottom zone; (ii) polymerising at least one olefin in the presence of a polymerisation catalyst in a fluidised bed formed by particles of a polymer of the at least one olefin suspended in an upwards flowing stream of the fluidisation gas in the middle zone; (iii) withdrawing a second stream comprising the fluidisation gas and particles of the polymer of the at least one olefin from the top zone; (iv) passing the second stream into a separation step; (v) withdrawing a third stream comprising the majority of the particles of the polymer of the at least one olefin from the separation step and returning the third stream to the polymerisation reactor through a transfer pipe, characterised in that the process comprises adding a support gas stream to the third stream downstream of the separation step into the transfer pipe.

BRIEF DESCRIPTION OF THE DRAWINGS

FIG. 1 discloses a process according to the present invention.

DETAILED DESCRIPTION

Definitions

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

As it is well understood in the art the superficial gas velocity denotes the velocity of the gas in an empty construction. Thus, the superficial gas velocity within the middle zone is the volumetric flow rate of the gas (in $m^3/s$) divided by the cross-sectional area of the middle zone (in $m^2$) and the area occupied by the particles is thus neglected.

The olefins polymerised in the process of the present invention are typically alpha-olefins having from 2 to 10 carbon atoms. Preferably the olefins are ethylene or propylene, optionally together with one or more other alpha-olefins having from 2 to 8 carbon atoms. Especially preferably the process of the present invention is used for polymerising ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

By fluidisation gas is meant the gas comprising monomer, and eventual comonomers, chain transfer agent and inert components which form the upwards flowing gas in the fluidised bed reactor and in which the polymer particles are suspended in the fluidised bed. The unreacted gas is collected at the top of the reactor, compressed, cooled and returned to the bottom of the reactor. As it is understood by the person skilled in the art the composition of the fluidisation gas is not constant during the cycle. Reactive components are consumed in the reactor and they are added into the circulation line for compensating losses.

Unless specifically otherwise defined, the percentage numbers used in the text refer to percentage by weight.

Catalyst

The polymerisation is conducted in the presence of an olefin polymerisation catalyst. The catalyst may be any catalyst which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has median particle size from 6 to 90 µm, preferably from 6 to 70 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and E-PA-1739103.

Prior Polymerisation Stages

The polymerisation in the fluidised bed may be preceded by prior polymerisation stages, such as prepolymerisation or another polymerisation stage conducted in slurry or gas phase. Such polymerisation stages, if present, can be conducted according to the procedures well known in the art. Suitable processes including polymerisation and other process stages which could precede the polymerisation process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerisation stages.

Gas Phase Polymerisation

In the gas phase polymerisation reactor the polymerisation takes place in a fluidised bed formed by the growing polymer particles in an upwards moving gas stream. In the fluidised bed the polymer particles, containing the active catalyst, come into contact with the reaction gases, such as monomer, comonomer(s) and hydrogen which cause polymer to be produced onto the particles.

The polymerisation takes place in a reactor including a bottom zone, a middle zone and a top zone. The bottom zone forms the lower part of the reactor in which the base of the fluidised bed is formed. The base of the bed forms in the bottom zone with no fluidisation grid, or gas distribution plate, being present. Above the bottom zone and in direct contact with it is the middle zone. The middle zone and the upper part of the bottom zone contain the fluidised bed. Because there is no fluidisation grid there is a free exchange of gas and particles between the different regions within the bottom zone and between the bottom zone and the middle zone. Finally, above the middle zone and in direct contact therewith is the top zone.

The upwards moving gas stream is established by withdrawing a fluidisation gas stream from the top zone of the reactor, typically at the highest location. The gas stream withdrawn from the reactor is then compressed and cooled and re-introduced to the bottom zone of the reactor. Preferably, the gas is filtered before being passed to the compressor. Additional monomer, eventual comonomer(s), hydrogen and inert gas are suitably introduced into the circulation gas line. It is preferred to analyse the composition of the circulation gas, for instance, by using on-line gas chromatography and adjust the addition of the gas components so that their contents are maintained at desired levels.

The circulation gas line comprises at least one separation step, which is preferably a cyclone. The cyclone has the objective of removing the entrained polymer from the circulation gas. The polymer stream recovered from the cyclone can be directed to another polymerisation stage, or it may be returned into the fluidised bed reactor or it may be withdrawn as the polymer product. According to the present invention at least a part of the polymer recovered from the cyclone is returned to the fluidised bed reactor.

As it is well understood by the person skilled in the art the entrainment rate of the polymer depends on the bed height and the fluidisation velocity. Typically, the powder entrainment flux is from 0.5 to 100 kg/(s·m$^2$), such as from 0.7 to 70 kg/(s·m$^2$), wherein the entrainment flux is given as the flow rate of the powder entrained from the reactor with the fluidisation gas (in kg/s) divided by the cross-sectional area of the pipe through which the fluidisation gas is withdrawn from the top of the fluidised bed reactor (pipe 12 and outlet 9 in FIG. 1). The process of the present invention is especially useful when the entrainment flux is at the upper end of the range, such as from 20 to 70 kg/(s·m$^2$).

The bottom zone of the reactor has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidised bed starts to form. When the gas velocity becomes still smaller the bed becomes denser and the polymer particles distribute the gas over the whole cross-section of the bed.

Preferably, the equivalent cross-sectional diameter of the bottom zone is monotonically increasing with respect to the flow direction of the fluidisation gas through the fluidised bed reactor. As the flow direction of the fluidisation gas is upwards with respect to the base, the equivalent cross-sectional diameter of the bottom zone is vertically monotonically increasing.

The bottom zone preferentially has straight circular cone shape. More preferably, the cone-angle of the cone-shaped bottom zone is 5° to 30°, even more preferably 7° to 25° and most preferably 9° to 18°, whereby the cone-angle is the angle between the axis of the cone and the lateral surface. It is not necessary in this preferred embodiment, however, that the bottom zone has the shape of a perfect cone but it may also have a shape of a truncated cone.

The bottom zone may also be seen as being constructed of a plurality of conical sections having different cone-angles. In such a case it is preferred that at least the conical section where the base of the fluidised bed is formed has the cone-angle within the above-specified limits. In a most preferred embodiment all the conical sections forming the bottom zone have the cone-angles within the above-specified limits. If the bottom zone comprises multiple conical sections it is then preferred that the steeper sections with a narrower cone angle are located at the lower end of the bottom zone and the sections with a wider cone angle are located at the higher end of the bottom zone. Such arrangement is believed to increase the shear forces at the wall of the reactor thus helping to prevent the polymer from adhering to the walls.

It is further preferred that the equivalent diameter of the bottom zone increases from about 0.1 to about 1 metres per one metre of height of the bottom zone (m/m). More preferably, the diameter increases from 0.15 to 0.8 m/m and in particular from 0.2 to 0.6 m/m.

The preferred cone-angles lead to additional improved fluidisation behaviour and avoid the formation of stagnant zones. As a result, the polymer quality and stability of the process are improved. Especially, a too wide cone-angle leads to an uneven fluidisation and poor distribution of the gas within the bed. While an extremely narrow angle has no detrimental effect on the fluidisation behaviour it anyway leads to a higher bottom zone than necessary and is thus not economically feasible.

It is possible that there is an at least one additional zone being located below the bottom zone. It is preferred that the at least one additional zone, or if there is more than one additional zone, the total of the additional zones contributes/contribute to a maximum of 15% to the total height of the reactor, more preferably 10% to the total height of the reactor and most preferably less than 5% of the total height of the reactor. A typical example for an additional zone is a gas entry zone.

The fluidised bed reactor of the present invention comprises no gas distribution grid or plate. The even distribution of the fluidisation gas within the bed is achieved by the shape of the bottom zone. The omission of the gas distribution grid reduces the number of locations where fouling and chunk formation can start. The terms gas distribution grid or gas distribution plate or fluidisation grid are used synonymously to denote a metal plate or a construction within the reactor which has a purpose of distributing the fluidisation gas evenly throughout the cross-sectional area of the reactor. In the reactors where a gas distribution grid is used it generally forms the base of the fluidised bed.

The middle zone of the fluidised bed reactor has a generally cylindrical shape. Preferably it will be in the form of a straight circular cylinder being denoted herein simply cylinder. From a more functional perspective, the middle zone will essentially form a domain wherein the superficial velocity of the fluidisation gas is essentially constant.

The middle zone typically contains most of the fluidised bed. While the bed extends also to the bottom and top zones, its major part is within the middle zone.

The middle zone has a ratio of the height over diameter (L/D) of at least about 4, preferably at least about 5. The height over diameter is typically not more than 15, preferably not more than 10.

The gas velocity within the middle zone is such that an effective circulation of solids is achieved. This leads to good heat and mass transfer within the bed, which reduce the risk of chunk formation and fouling. Especially, good powder flow near the walls of the reactor has been found to reduce the adhesion of polymer at the wall of the reactor. Suitably the superficial velocity of the fluidisation gas is within the range of from 0.35 to 1.0 m/s. The process of the present invention is especially useful when the superficial velocity of the fluidisation gas is within the range of from 0.40 to 0.9 m/s, preferably from 0.45 to 0.90 m/s, especially preferably from 0.50 to 0.90 m/s and in particular from 0.55 to 0.90 m/s.

The height L of the middle zone is the distance of the lowest point of the generally cylindrical part of the reactor to the highest point of the generally cylindrical part of the reactor. The lowest point of the generally cylindrical part is the lowest point above which the diameter of the reactor no longer increases with the height of the reactor but remains constant. The highest point of the generally cylindrical part is the lowest point above which the diameter of the reactor no longer remains constant with the height of the reactor but decreases. The diameter D of the middle zone is the (equivalent) diameter of the reactor within the generally cylindrical part.

The top zone of the reactor is shaped such that a gas-particle stream vicinal to the inner walls is created, whereby the gas-particle stream is directed downwards to the base. This gas-particle stream leads to an excellent particle-gas distribution and to an excellent heat transfer. Further the high velocity of the gas and particles vicinal to the inner walls minimizes lump- and sheet formation. The top zone has a generally conical, upwards tapering shape. It is further preferred that the ratio of the height of the top zone to the diameter of the middle zone is within the range of from 0.3 to 1.5, more preferably 0.5 to 1.2 and most preferably 0.7 to 1.1.

It is particularly preferred that the cone forming the top zone is a straight circular cone and the cylinder forming the middle zone preferably is a circular cylinder. More preferably the cone-angle of the cone-shaped top zone is 10° to 50°, most preferably 15 to 45°. As defined above, the cone-angle is the angle between the axis of the cone and the lateral area.

The specific cone-angles of the cone-shaped upper zone further improve the tendency for back-flow of the particles counter current to the fluidisation gas. The resulting unique pressure balance leads to an intensive break up of bubbles, whereby the space-time-yield and solids concentration are further increased. Further as mentioned above, the wall flow velocity, i.e., the velocity of particles and gas vicinal to the inner walls is high enough to avoid the formation of lumps and sheets.

Polymer is withdrawn from the reactor. As it was discussed above, one part of the polymer may be withdrawn by using the cyclone installed in the circulation gas stream. However, the amount of polymer withdrawn therefrom is usually not sufficient for withdrawing the whole polymer production from the reactor. Therefore, it is preferred to withdraw polymer also from the reactor, especially preferably from the middle zone of the reactor.

The polymer is withdrawn from the middle zone in any manner known in the art, either intermittently or continuously. It is preferred to withdraw the polymer continuously because then the conditions in the reactor fluctuate less than with intermittent withdrawal. Both methods are well known in the art. Continuous withdrawal is disclosed, among others, in WO-A-00/29452, EP-A-2330135 and EP-A-2594433. Intermittent withdrawal is disclosed, among others, in U.S. Pat. No. 4,621,952, EP-A-188125, EP-A-250169 and EP-A-579426.

In a preferred continuous withdrawal method the polymer is withdrawn through an open pipe. In one preferred embodiment the pipe is equipped with a control valve whose position is automatically adjusted to maintain a desired outflow rate. The valve position may be set, for instance, by the reactor bed level controller. In another preferred embodiment the pipe discharges the polymer to a vessel, the pressure of which is controlled to maintain a desired pressure difference between the reactor and the vessel. The pressure difference then sets the polymer flow rate from the reactor to the vessel.

The agglomerates eventually present in the reactor may be withdrawn by using one of the powder outlets, as disclosed in EP-A-2594433. However, it is also possible and preferred to withdraw them through a separate outlet which is preferably located within the bottom zone and suitably below the base of the fluidised bed. After recovering the agglomerates may be disposed of or they may be crushed and mixed with the product.

Catalyst, which is optionally dispersed within polymer, is introduced into the reactor, suitably into the fluidised bed. Any method known in the art may be used for introducing the catalyst. According to one method the catalyst, or the polymer containing the catalyst, is introduced in a stream of inert gas. According to another method the catalyst is introduced as slurry in a liquid diluent.

It is possible to introduce the catalyst, optionally dispersed within polymer particles, also into the bottom zone to the level where the base of the bed is formed or even below it. The fluidisation gas then transports the particles into the fluidised bed. This is especially useful when the gas phase reactor is preceded by a prior polymerisation stage. The catalyst is then dispersed within the polymer particles formed in the prior polymerisation stage.

As discussed above, a polymer powder stream is withdrawn from the cyclone and returned to the fluidised bed reactor. Thereby, the polymer powder stream is returned to the fluidised bed reactor through a transfer pipe. The powder stream is typically returned into the fluidised bed below the top level of the fluidised bed. Suitably the powder stream is returned to the middle zone of the fluidised bed reactor. To ensure a stable operation of the reactor the flow of the powder into the reactor should be continuous without interruptions. Furthermore, to avoid plugging of the transfer pipe the residence time of the powder in the pipe should be short. Therefore, smooth flow of powder in the transport pipe is essential.

A smooth flow of powder is ensured if the pressure difference over the transfer pipe is sufficient. A sufficiently great value of the pressure difference is obtained if the bed level is low or the bed density is small. However, when the bed is dense and the bed is maintained at a high level then the pressure difference becomes smaller and may be come insufficiently small. Then the powder flow to the fluidised bed may stop, leading to unstable reactor conditions.

According to the present invention a smooth flow is achieved when a stream of a support gas is introduced into the transfer pipe. The support gas may be any gas which does not disturb the operation of the fluidised bed reactor. It may thus be an inert gas, such as propane or nitrogen, or, preferably, it may be the fluidisation gas. When fluidisation gas is used as the support gas the support gas stream is then preferably taken from the circulation gas stream downstream of the compressor.

The flow rate of the support gas should be such that the ratio of the mass flow rate of the support gas in the transfer pipe to the mass flow rate of the powder in the transfer pipe is from 0.001 to 0.070 kg/kg, preferably from 0.0015 to 0.060 kg/kg. The greater the pressure drop over the transfer pipe is, the smaller flow of the support gas is needed. For instance, a gas to powder ratio within the range of from 0.002 to 0.05 kg/kg has produced good results.

The support gas stream is suitably introduced to the upstream part of the transfer pipe connecting the separation stage and the polymerisation reactor. Thus, where the separation step is conducted in a cyclone, the support gas stream may be introduced at the powder outlet of the cyclone. Alternatively, if the separation step includes means for withdrawing the polymer from the separation step, the support gas stream may be introduced to the connecting pipe immediately downstream of the withdrawing means (such as rotary feeder). It is also possible to feed support gas to the downstream end of the connecting pipe. Also multiple feed points of the support gas are possible, for instance, combining two or more of the above-mentioned alternatives.

Post-Reactor Treatment

When the polymer has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

Benefits of the Invention

The present invention allows a stable operation of the fluidised bed reactor. The level and the density of the fluidised bed can be maintained within acceptable limits. Then also the concentrations of the reactants in the fluidisation gas remain stable. Further, the pressure balance among the various parts of the process is developed in such a way that smooth and continuous solids circulation is reassured.

The process of the present invention allows the fluidised bed reactor operated at greater fluidisation velocity without problems. The fluidisation velocity within the range of from 0.35 to 1.0 m/s, such as 0.40 to 0.90 m/s can be achieved. At the same time the separation efficiency of the cyclone is at a high level, like 0.95 or greater, such as 0.97 or greater, preferably 0.99 or greater and even more preferably 0.995 or greater.

The separation efficiency $\eta$ can be calculated as:

$$\eta = \frac{m_s}{m_s + m_g}$$

where $m_s$ is the mass flow rate of polymer particles in the underflow (or, the solids-containing stream) and $m_g$ is the mass flow rate of polymer particles in the overflow (or the gas stream).

Description of the Drawings

FIG. 1 shows a reactor system according to the present invention. The reactor (1) has a bottom zone (5), a middle zone (6) and a top zone (7). The fluidisation gas is introduced into the bottom zone (5) through the opening (8). While the gas flows upwards through the bottom zone (5) its superficial velocity reduces due to the increasing diameter. A fluidised bed starts to form within the bottom zone (5). The gas continues to travel upwards through the middle zone (6) where the gas velocity is constant and the bed is fully formed. Finally the gas reaches the top zone (7) from where it is withdrawn through the opening (9). The gas, together with entrained solids, passes along line (12) to a cyclone (2). The cyclone (2) removes most of the entrained solid from the circulation gas which is passed through the gas outlet (13) along the lines (16) and (18) to a compressor (17). Before the compressor (17) there is preferably a filter (4). In the compressor (17) the gas is pressurized and passed through line (19) to a cooler (3) where it is cooled. From the cooler (3) the gas is passed along the line (20) into the inlet (8) of the reactor (1).

The solid stream is passed from the cyclone (2) through the opening (14) to line (22) by using a rotary feeder (21). In place of the rotary feeder (21) also other powder feed arrangement can be used. Downstream of the rotary feeder (21) there is a three-way valve (15) which directs the powder stream either via line (23) to downstream process stages or returns the powder stream into the reactor (1) along line (22) through the opening (24).

The support gas is introduced into the line (22) via one or more of the lines (26). It is possible to feed fresh support gas (for instance, when an inert gas, such as nitrogen, is used as the support gas) via feed lines 25. However, it is also possible to use the fluidisation gas as the support gas. The fluidisation gas is then conveniently passed to the support gas feed lines (26) via one or more lines (27) from a point in the circulation gas line (19), (20) downstream of the compressor (17).

The polymer product is withdrawn from the reactor (1) along one or more outlets (11). Catalyst, optionally dispersed within polymer particles from a preceding polymerisation stage, is introduced into the reactor (1) along line (10). Additional monomer, comonomer, hydrogen and inert gas may be introduced at a convenient location of the circulation gas line (16, 18, 19, 20).

EXAMPLES

In Examples 1 to 6 the reactor was operated at an absolute pressure of 20 bars and a temperature of 85° C. Propane was used as the fluidisation gas. The bed was formed of high-density polyethylene particles having an average diameter ($d_{50}$) of 200 μm. HDPE had a density of 950 kg/m$^3$ and MFR$_5$ of 0.27 g/10 min.

Height of the bottom zone: 900 mm
Height of the middle zone: 1500 mm
Height of the upper zone 415 mm
Diameter of the middle zone 300 mm Example 1 (Reference)

The reactor as described above was operated so that flow rate of the fluidisation gas was 115 m$^3$/h. The bed was filled with HDPE with a filling degree of about 70% of the volume of the middle zone. The superficial gas velocity in the middle zone 0.45 m/s, and gas velocity in the inlet pipe, where the diameter of the reactor was 70 mm, was 8 m/s. The entrainment flux was 0.85 kg/(s·m$^2$) corresponding to powder entrainment rate of 12 kg/h. The diameter of the outlet pipe was 70 mm. The powder was returned to the fluidised bed reactor without a problem without addition of support gas.

Example 2 (Comparative)

The procedure of Example 1 was repeated with the exception that the flow rate of the fluidisation gas was changed so that the superficial gas velocity in the middle zone 0.65 m/s. The entrainment flux was 31 kg/(s·m$^2$) corresponding to powder entrainment rate of 430 kg/h. The powder was returned to the fluidised bed reactor without addition of support gas. The transfer pipe between the cyclone and the reactor plugged frequently, resulting in stops in powder transport from cyclone to the reactor. Thereby bed level and bed density fluctuated. Also, the operation of the cyclone became worse, leading to a poor efficiency.

Example 3 (Comparative)

The procedure of Example 2 was repeated with the exception that the flow rate of the fluidisation gas was changed so that the superficial gas velocity in the middle zone 0.75 m/s.

The entrainment flux was 43 kg/(s·m$^2$) corresponding to powder entrainment rate of 590 kg/h. The powder was returned to the fluidised bed reactor without addition of support gas. The transfer pipe between the cyclone and the reactor plugged frequently, resulting in stops in powder transport from cyclone to the reactor. Thereby bed level and bed density fluctuated and the separation efficiency of the cyclone was poor.

Example 4

The procedure of Example 2 was repeated except that support gas was fed into the downstream of the cyclone (the line (26) immediately downstream of the rotary feeder (21) in FIG. 1) so that the ratio of the support gas flow to the powder flow was 0.01 kg/kg. The powder was returned to the fluidised bed reactor without a problem and the separation efficiency of the cyclone was good, being greater than 99.5%.

Example 5

The procedure of Example 3 was repeated except that support gas was fed into the downstream of the cyclone (the line (26) immediately downstream of the rotary feeder (21) in FIG. 1) so that the ratio of the support gas flow to the powder flow was 0.007 kg/kg. The powder was returned to the fluidised bed reactor without a problem and the separation efficiency of the cyclone was good being greater than 99.5%.

TABLE 1

Fluidised bed and powder return pipe operation data

| | Support gas/solids, kg/kg | Entrainment flux, Kg/sm$^2$ | Superficial velocity, m/s | Support gas | Cyclone Efficiency | Plant Operability |
|---|---|---|---|---|---|---|
| Example 1 | 0 | 0.85 | 0.45 | off | high | stable |
| Example 2 | 0 | 31.2 | 0.65 | off | low | unstable |
| Example 3 | 0 | 42.6 | 0.75 | off | low | unstable |
| Example 4 | 0.01 | 31.2 | 0.65 | on | high | stable |
| Example 5 | 0.0074 | 42.6 | 0.75 | on | high | stable |

The invention claimed is:

1. A process of polymerising at least one olefin in a fluidised bed in a fluidised bed polymerisation reactor comprising a top zone having a generally conical shape, a middle zone in direct contact and below said top zone having a generally cylindrical shape, a bottom zone in direct contact with and below the middle zone and having a generally conical shape and wherein a base of a fluidised bed is formed and wherein the reactor does not comprise a fluidisation grid, the process comprising the steps of
   (i) passing a first stream of fluidisation gas into the bottom zone;
   (ii) polymerising at least one olefin in the presence of a polymerisation catalyst in a fluidised bed formed by particles of a polymer of the at least one olefin suspended in an upwards flowing stream of the fluidisation gas in the middle zone;
   (iii) withdrawing a second stream comprising the fluidisation gas and particles of the polymer of the at least one olefin from the top zone;
   (iv) passing the second stream into a separation step;
   (v) withdrawing a third stream comprising the majority of the particles of the polymer of the at least one olefin from the separation step and returning the third stream to the polymerisation reactor through a transfer pipe,
   characterised in that the process comprises adding a support gas stream to the third stream downstream of the separation step into the transfer pipe, wherein entrainment flux of the particles of the polymer of the at least one olefin entrained from the polymerization reactor in the second stream, defined as the mass flow rate of the particles divided by the cross-sectional area of the pipe, is 0.5 to 100 kg/(s·m$^2$).

2. The process according to claim 1 wherein the superficial velocity of the upwards flowing stream of the fluidisation gas in the middle zone has a superficial velocity of from 0.35 to 1.0 m/s.

3. The process according to claim 2 wherein the superficial velocity of the upwards flowing stream of the fluidisation gas in the middle zone has a superficial velocity of from 0.40 to 1.0 m/s.

4. The process according to claim 3 wherein the superficial velocity of the upwards flowing stream of the fluidisation gas in the middle zone has a superficial velocity of from 0.45 to 0.90 m/s.

5. The process according to claim 1 comprising a step of withdrawing fourth stream comprising the fluidisation gas with a reduced content of particles of the polymer of the at least one olefin from the separation step.

6. The process according to claim 5 wherein the separation step is conducted in a cyclone.

7. The process according to claim 6 wherein the separation efficiency of the cyclone, defined as the ratio of the mass flow rate of particles contained in the third stream to the sum of the mass flow rates of particles contained in the third and the fourth streams, is at least 0.95.

8. The process according to claim 7 wherein the separation efficiency of the cyclone is at least 0.99.

9. The process according to claim 8 wherein the third stream is withdrawn from the cyclone by using a rotary feeder.

10. The process according to claim 1 wherein the support gas is the same as the fluidisation gas.

11. The process according to claim 1 wherein the support gas is an inert gas.

12. The process according to claim 1 wherein the entrainment flux is from 20 to 70 kg/(s·m$^2$).

13. The process according to claim 1 wherein ratio of the mass flow rate of the support gas in the transfer pipe to the mass flow rate of the powder in the transfer pipe is from 0.001 to 0.070 kg/kg.

14. The process according to claim 2 wherein the support gas is the same as the fluidisation gas.

15. The process according to claim 2 wherein the support gas is an inert gas.

16. The process according to claim 2 wherein the entrainment flux is from 20 to 70 kg/(s·m$^2$).

17. The process according to claim 2 wherein ratio of the mass flow rate of the support gas in the transfer pipe to the mass flow rate of the powder in the transfer pipe is from 0.001 to 0.070 kg/kg.

18. The process according to claim 3 wherein the support gas is an inert gas.

19. The process according to claim 3 wherein the entrainment flux is from 20 to 70 kg/(s·m$^2$).

20. The process according to claim 3 wherein ratio of the mass flow rate of the support gas in the transfer pipe to the mass flow rate of the powder in the transfer pipe is from 0.001 to 0.070 kg/kg.

\* \* \* \* \*